United States Patent

[11] 3,607,426

| [72] | Inventor | Leonard W. Niedrach |
| | | Schenectady, N.Y. |
| [21] | Appl. No. | 693,639 |
| [22] | Filed | Dec. 26, 1967 |
| [45] | Patented | Sept. 21, 1971 |
| [73] | Assignee | General Electric Company |

[54] FUEL CELL ELECTRODE
12 Claims, 4 Drawing Figs.

| [52] | U.S. Cl. | 136/86 D, 136/120 FC |
| [51] | Int. Cl. | H01m 27/04, H01m 13/00 |
| [50] | Field of Search | 136/120 FC, 86 |

[56] References Cited
UNITED STATES PATENTS

| 3,369,886 | 2/1968 | Metzger et al. | 136/120 UX |
| 3,248,267 | 4/1966 | Langer et al. | 136/120 X |

FOREIGN PATENTS

| 1,477,235 | 3/1967 | France | 136/120 |

*Primary Examiner*—Winston A. Douglas
*Assistant Examiner*—M. J. Andrews
*Attorneys*—Richard R. Brainard, Paul A. Frank, Charles T. Watts, Paul R. Webb, II, Frank L. Neuhauser, Oscar B. Waddell and Melvin M. Goldenberg ABSTRACT: Fuel cell electrodes are composed of a mixture of catalytic and gas-adsorbing materials of a chromium-tungsten oxide and a metal selected from the class consisting of noble metals and alloys of noble metals, a current collector, and a binder bonding the materials together and to the current collector in electronically conductive relationship. An adhesive binder is employed which is not chemically attacked by the electrolyte or the reactant fluid of the cell in which the electrode is used. Such an electrode is particularly useful in a fuel cell employing a fuel containing carbon monoxide, such as reformer gas, an acid electrolyte, and under various operating conditions.

Inventor:
Leonard W. Niedrach,
by Paul R. Webb, II
His Attorney.

Inventor:
Leonard W. Niedrach,
by Paul R. Webb, II
His Attorney

FUEL CELL ELECTRODE

This invention relates to fuel cell electrodes and, more particularly, to fuel cell electrodes comprising a mixture of catalytic gas-adsorbing materials of a chromium-tungsten oxide and a metal selected from the class consisting of noble metals and alloys of noble metals bonded together and bonded to a current collector in electrically conductive relationship by a binder.

As it is well known, fuel cells are devices capable of generating electricity by electrochemically combining an oxidizable reactant, termed a fuel, and a reducible reactant, termed an oxidant. The reactants are fluids, either liquids or gases, and usually fed continuously to the cell from separate external sources. The fuel cell itself is comprised of spaced electrodes ionically connected by an electrolyte. It is a characteristic of fuel cells that the electrodes and electrolyte remain substantially chemically invariant in use.

Each electrode is electronically conductive, adsorbs the fuel or oxidant employed, presents an active material for the electrode reaction, and does not oxidize unduly under the operating conditions of the cell. When fuel and oxidant are concurrently and separately supplied to the different electrodes of the fuel cell, an electrical potential will develop across the electrodes. When an electrical load is provided across the electrodes, an electrical current flows therebetween, the electrical energy thus represented being generated by the electrocatalytic oxidation of fuel at one electrode and the simultaneous electrocatalytic reduction of oxidant at the other. Suitable noble metals for catalysts are well known and many are described for example in "Catalysts, Inorganic and Organic," Berkman, Morrel and Egloff, Reinhold Publishing Company, New York (1940); "Catalytic Chemistry," H. W. Lohse, Chemical Publishing Company, Inc., New York (1945); etc. Suitable noble metals include the noble metals of Group VIII series of metals of the Periodic Table of Elements, which are rhodium, ruthenium, palladium, osmium, iridium, and platinum, and noble metal alloys from this group.

Since the adsorption of gases on solids is a surface phenomena, it is desirable that the catalysts be of the maximum practicable surface area and that the surface of the catalyst material preferably be in its most active state for the adsorption of gases. Thus, the extent and character of the surface presented by such catalytic material in a fuel cell electrode is an important factor in the securing of superior electrode performance. It is, of course, possible to insure an extensive catalytically active surface in a fuel cell electrode by utilizing large quantities of catalytically active material. However, the most highly catalytically active materials are expensive, accordingly, these catalytic materials should be utilized in as efficient manner as possible. The most efficient utilization of catalyst is achieved by distributing the catalytic materials so that the greatest amount of surface area may be secured per unit weight of the catalyst material.

Our present invention is directed to a fuel cell electrode which comprises a mixture of catalytic and gas-adsorbing materials of a chromium-tungsten oxide and a metal selected from the class consisting of noble metals and alloys of noble metals bonded together and bonded to a current collector in electronically conductive relationship by a binder. Such an electrode is particularly useful in fuel cells employing reformer gas or carbon monoxide fuel, an acid electrolyte, and under various operation conditions.

It is a primary object of my invention to provide an improved electrode which is tolerant to carbon monoxide without adverse effect to the catalytic characteristics of the electrode.

It is another object of my invention to provide such an electrode incorporating a binder thereby securing efficient utilization of the catalyst.

It is a further object of my invention to provide a fuel cell which employs such an electrode as the anode therein and which operates on a fuel containing carbon monoxide.

In accordance with my invention, an electrode comprises a mixture of catalytic and gas-adsorbing materials of a chromium-tungsten oxide and a metal selected from the class consisting of noble metals and alloys of noble metals, a current collector, and a binder bonding the materials together and to the current collector in electronically conductive relationship.

These and various other objects, features and advantages of the invention will be better understood from the following description taken in connection with the accompanying drawing in which.

Figure 1:
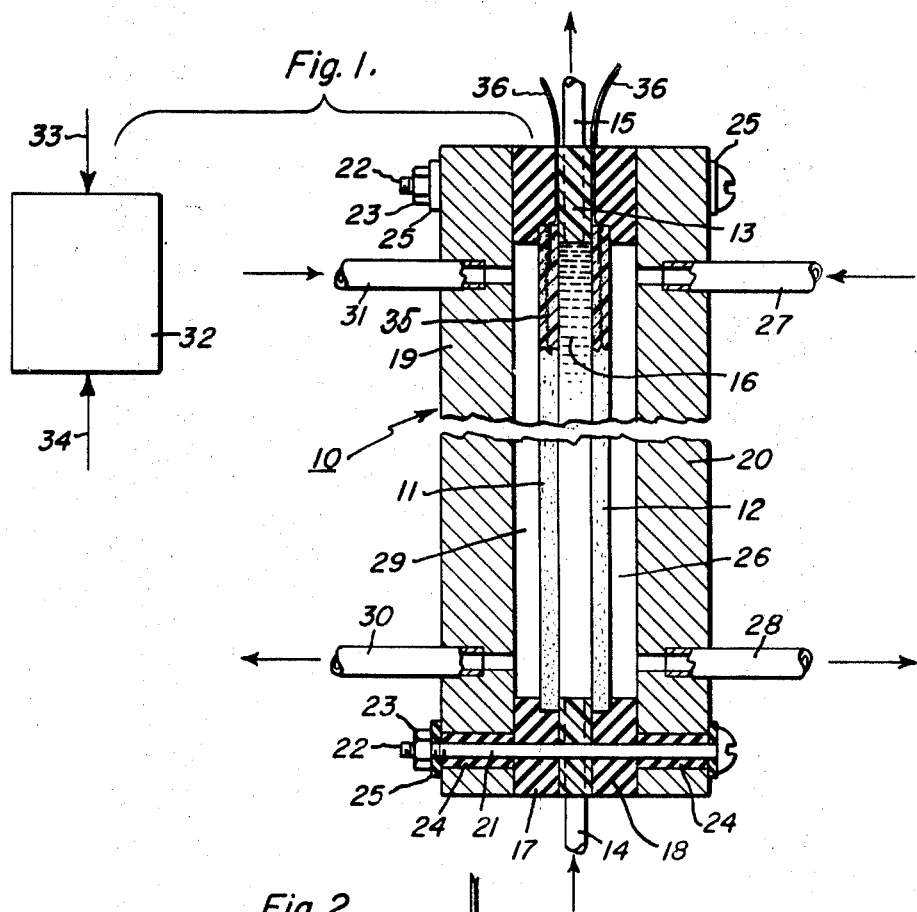
FIG. 1 is a sectional view of a fuel cell made in accordance with my invention.

In FIG. 1 of the drawing, there is shown generally at 10 a fuel cell embodying my invention which comprises a preferred anode 11 and a cathode 12, separated by an annular electrolyte gasket 13. Electrolyte inlet conduit 14 and electrolyte outlet conduit 15 are sealingly related to the electrolyte gasket to circulate a free aqueous electrolyte to and from electrolyte chamber 16 formed by the anode, cathode and gasket. An anode gasket 17 and a cathode gasket 18 are positioned adjacent opposite faces of the electrolyte gasket to seal therewith and to hold the anode and cathode in assembled relation. Identical end plates 19 and 20 are associated with the anode and cathode gaskets, respectively, in sealing relation therewith. To hold the gaskets and end plates in assembled relation, a plurality of tie bolts 21 are provided, each having a threaded end 22 and a nut 23 mounted thereon. To insure against any possibility of internal short circuiting of the fuel cell electrodes, the tie bolts are provided with insulative bushings 24 within each end plate and with an insulative washer 25 adjacent each terminus.

An oxidant chamber 26 is formed by the cathode gasket, cathode, and end plate 20. An oxidant inlet conduit 27 is sealingly associated with the end plate to allow oxidant to be fed to the oxidant chamber while an oxidant outlet conduit 28 is similarly associated with the end plate to allow the purge of oxidant. Where the fuel cell is to be operated on ambient air, no end plate 20 is required. The anode, anode gasket, and end plate 19 similarly cooperate to form a fuel chamber 29. A fuel outlet conduit 30, similar to oxidant outlet conduit 28, is provided. A fuel inlet conduit 31 is shown for providing a fuel to the fuel chamber from a fuel source 32, schematically shown. Where the fuel source is a synthetic reformer gas, a hydrocarbon or oxidized derivatives thereof would be supplied to source 32, as indicated by flow arrow 33, while water would be supplied to source 32, as indicated by flow arrow 34.

Figure 2:
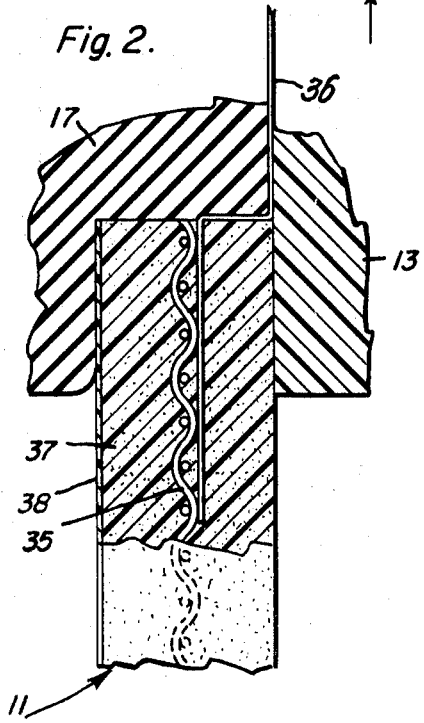
FIG. 2 is an enlarged sectional view of a fuel cell electrode made in accordance with my invention.

In FIG. 2 of the drawing there is shown generally a preferred fuel cell electrode anode 11 embodying my invention which has a current collector 35 in the form of a metal wire screen which serves the function of transmitting electrical current and providing reinforcement for the electrode. An electrical connection in the form of an electrical lead 36 is connected directly to screen 35. Lead 36 passes to the outside of fuel cell 10 as shown in FIG. 1 at the interface of gasket 17 and gasket 13, which elements form part of the fuel cell housing. Electrode 11 has a noble metal or an alloy of a noble metal and a chromium-tungsten oxide bonded together by a binder and bonded to the current collector in electronically conductive relationship. For example, a mixture of platinum and a chromium-tungsten oxide are held together and bonded to screen 35 by a binder material of polytetrafluoroethylene. This mixture 37 surrounds both the screen 35 and a portion of electrical lead 36. The ratio of such a binder to the mixture of catalysts may be from about 5 to 50 percent by weight, with the preferred range being from about 10 to 30 percent by weight. If desired, a hydrophobic film 38 is shown bonded to one surface of mixture 37 to prevent electrolyte flow through electrode 11. This film is desirable if the electrode is to be used with a free aqueous electrolyte.

The preferred electrolyte for use in a fuel cell employing the above electrode is sulfuric acid, $H_2SO_4$. Additionally, other acid electrolytes may be employed which are suitable for fuel cell operation. Such acid electrolytes include, for example, $H_3PO_4$, $HClO_4$, aryl and alkyl sulfonic acid, etc. The above electrode may be used in combination with an ion exchange membrane, a porous matrix for immobilizing an aqueous electrolyte, or a free aqueous electrolyte.

As it is well known, fuel cells, which operate on hydrogen, generally produce markedly reduced electrical output when the fuel is contaminated with carbon monoxide. The reason for such decreased performance has been recognized as attributable to carbon monoxide poisoning of the electrocatalyst incorporated in the anode. Where the fuel contains a substantial carbon monoxide content it has been common practice to protect the fuel cell against electrocatalyst poisoning by removing carbon monoxide before delivery to the fuel cell. In the case of reformer gas, for example, which is a mixture of hydrogen, carbon dioxide, water vapor, carbon monoxide, and hydrocarbons, usually present quantitatively in that order, the carbon monoxide can be removed either by conversion to carbon dioxide or methane before the gas is supplied to the fuel cell. Alternately, the hydrogen can be purified by passage through a silver-palladium membrane. Thus, while platinoid metals have been frequently categorically designated as fuel electrocatalysts, it is apparent that use has been generally restricted to the electrocatalysis of reactants free from carbon monoxide contamination.

I discovered unexpectedly that the electrode of my invention operates effectively as an anode in a fuel cell employing a fuel containing carbon monoxide, such as synthetic reformer gas. Thus, the addition of the chromium-tungsten oxide in my electrode makes the electrode carbon monoxide tolerant and in fact promotes the oxidation of the fuel. Of a wide variety of noble metals, which were discussed above, I prefer to employ platinum metal or an alloy of platinum-ruthenium.

A wide series of chromium-tungsten oxides are suitable for mixing with a noble metal or an alloy of a noble metal to form a catalytic and gas-adsorbing material mixture for my electrode. Such a series includes a range of 0.1 to 1.65 $Cr_1O_3$ per $WO_x$, where x is in a preferred range of 1.5 to 2.5. While some decrease in activity is noted as the chromia content is increased, the superior corrosion resistance of the high-chromia oxides is quite advantageous. Thus, I prefer to employ a range of 0.8 to 1.0 $Cr_2O_3$ per $WO_x$. This oxide may be mixed with a noble metal in a wide range of proportions. However, a preferred range is 9 to 50 weight percent chromium-tungsten oxide to the total weight of the noble metal and oxide.

The current collector which requires material of good electrical conductivity can be provided in various configurations such as screens, metal wires, punched metal plate, expanded metal plate, porous metal sheet, etc. A wide variety of materials can be employed including platinum, gold, tantalum, and various nonnoble metals coated with platinum or gold. Any suitable manner is used to bond the material mixture to the collector to form an electrode.

The binder may be any adhesive material that is not chemically attacked by the electrolyte or the reactant fluid of the cell in which the electrode is to be used. Various binders meeting this criteria are known to the art. Preferred binders are hydrophobic halocarbons, most preferably fluorocarbon binders, having a critical surface tension less than the surface tension of water. A preferred maximum critical surface tension is 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962. Perfluorinated polymers such as polytetrafluoroethylene (PTFE) and polyhexafluoropropylene possess the highest degree of hydrophobicity and chemical stability of presently known binders and are accordingly preferred. "Teflon 30" is a trademarked name of a commercially available aqueous emulsion of polytetrafluoroethylene including a wetting agent and which is suitable as a binder for my electrode. The ration of such a binder to the total weight of the gas-adsorbing mixture excluding any current collector may be from about 5 to 50 percent by weight, with the preferred range from about 10 to 50 percent by weight.

One general method for preparing the fuel cell electrode anode as shown in FIGS. 1 and 2 of the drawing is as follows:

First, a precipitation method is employed to produce the chromium-tungsten oxide resulting in highly dispersed material. The hydroxide of chromium is precipitated from a solution of its chloride with ammonium hydroxide. This precipitate is wet blended with tungstic acid, $H_2WO_4$, having a surface area of about $12/cm.^2$. per gram. After air drying at 150° C., the mass is reduced at 600° to 800° C. in flowing hydrogen for a period of 4 hours. After cooling in argon, the material is ready for use.

One general method for preparing a fuel cell electrode anode as shown in FIGS. 1 and 2 of the drawing is as follows. An aqueous suspension containing 59.6 percent by weight PTFE is diluted with 7 volumes of water. An aluminum foil is used as the casting surface on which is scribed the ultimately desired pattern of the electrodes. The aluminum foil is placed on a hot plate maintained at 120°–150° C. to facilitate evaporation of the water as the PTFE emulsion is sprayed onto it, using an airbrush. The desired amount of spray per unit area is evenly distributed over the surface at a rate such that wet area do not accumulate and run. After the desired amount of emulsion has been sprayed onto the casting surface, it is heated at 350° C. to volatilize the emulsifying agent and to sinter the PTFE particles into a coherent film. A mixture of the chromium-tungsten oxide and noble metal powder or the alloy powder and PTFE emulsion is then prepared and diluted with sufficient water to give a thin slurry, which can be conveniently spread over the PTFE film on the casting surface to cover the scribed area showing the pattern of the desired electrode. When a uniform coating is achieved, the water is slowly evaporated from the emulsion on a hotplate whose bed temperature is slowly increased to a final value of 250°–350° C. to dispel the emulsifying agent.

To incorporate the current collector in the electrode, a similar procedure is used to form a second PTFE-chromium-tungsten-oxide-noble metal or alloy powder mix directly on another casing surface without an underlying PTFE film. The current collector, a 45-mesh platinum screen, is cut to the desired shape and is centered over the electrode pattern on one of the two casting surfaces and the other casting surface is then centered on top of the current collector. This assembly is placed between two press platens and molded at 350° C. for 10 minutes at a pressure of about 2,000 lbs./sq. inch of electrode surface. Following pressing, the aluminum foil casting surfaces are dissolved from the electrodes in 20 percent aqueous sodium hydroxide and the electrode structures are rinsed with water and dried. By this technique, electrodes are produced in which the current collector is sintered in the PTFE-chromium-tungsten-oxide-nobel metal or alloy mix and the electrode is coated on one side with a pure film of PTFE, to be placed facing the gaseous fuel in the cell. A plurality of these electrodes are prepared.

An illustrative operation of the above electrodes comprises the employment of the above electrodes as the anodes in fuel cells with platinum black electrodes bonded with PTFE, employed as the cathodes. The cathodes were prepared in the same manner as the anodes except that no oxide was included. The cells were operated with oxygen gas supplied to the cathodes and fuel contaminated with carbon monoxide supplied to the anodes. The hydrophobic film surfaces of the anodes and the cathodes faced the fuel gas streams and the oxygen gas streams respectively. A 5 normal sulfuric acid solution was used at the electrolyte and the cells were operated at a temperature of 85° C. Each cell operated quite satisfactorily with the fuel contaminated with carbon monoxide and its operation will be discussed further below in connection with the subsequent figures of the drawing.

Examples of fuel electrodes and fuel cells employing such electrodes made in accordance with my invention are set forth below:

EXAMPLES 1–6

Six fuel cell electrodes were made in accordance with FIGS. 1 and 2 of the drawing. One fuel cell electrode was made with platinum only bonded by PTFE. Each of the electrodes set forth in table I contained 34 milligrams of platinum per square centimeter and 6.8 milligrams of a chromium-tungsten oxide having a ratio of $y$ moles of $Cr_2O_3$ to 1 mole of $WO_x$. The PTFE binder content was 3 mg./cm.$^2$. The details as to the oxide composition of these six electrodes are set forth below in table I.

TABLE I

| Example No. | Moles of Chromium Oxide Per Mole of Tungsten Oxide, $WO_x$ in Added Oxide |
|---|---|
| 1 | No oxide added |
| 2 | 0.92 |
| 3 | 0.33 |
| 4 | 0.29 |
| 5 | 0.15 |
| 6 | 0.10 |

Each of the electrodes in examples 1–6 in above table I were prepared in accordance with previous description of electrode preparation and had a 1.6-milligram hydrophobic film of PTFE per square centimeter on the gas side. The electrode of example 1 has no oxide incorporated therein.

EXAMPLES 7–12

Each of the electrodes from examples 1–6 was employed as the anode in a fuel cell with an electrolyte of 5 normal $H_2SO_4$, and a cathode of platinum bonded with PTFE onto a current collector made in the same manner as the electrode of example 1. Each cathode has a platinum loading of 34 mg./cm.$^2$. A hydrophobic film of PTFE was provided on the cathode and on the anode, and a fuel gas with a composition of 78% $H_2$, 2.0% CO, 20% $CO_2$, and 0.25% $CH_4$ was supplied to the anode. Oxygen was supplied to the cathode. The cell was operated at 85° C.

Figure 3:
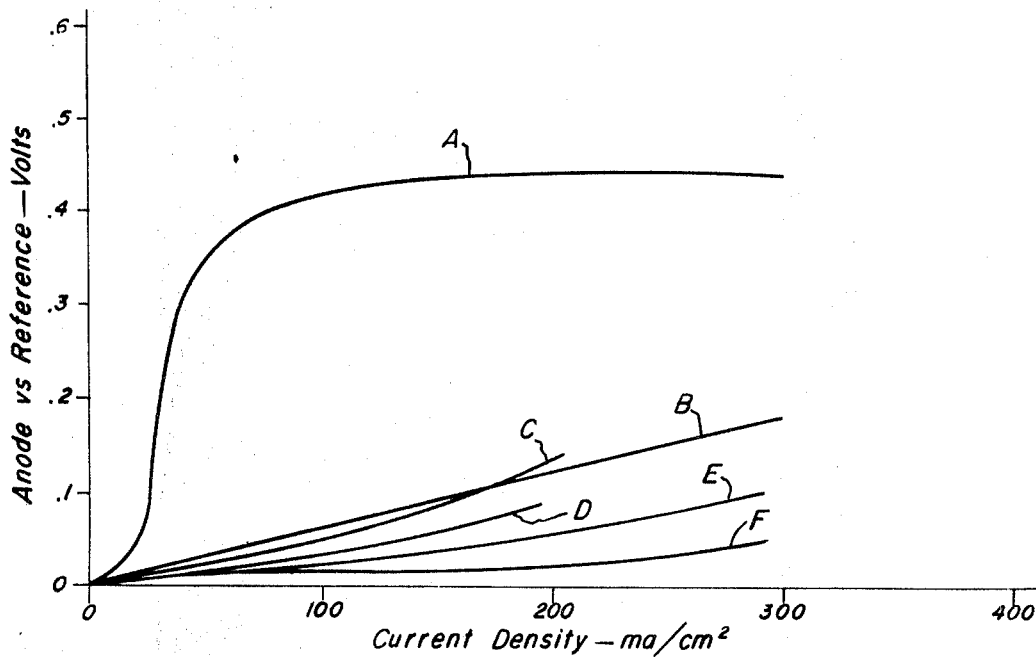
FIG. 3 is a plot showing the performance in a fuel cell with a synthetic reformer gas fuel of various fuel cell electrodes embodying my invention.

The effect of my electrodes as set forth above in examples 2–6 are compared with the electrode set forth in example 1 which contained only platinum. This comparison is shown in FIG. 3 of the drawing wherein the current density in milliamperes per square centimeter is plotted against anode versus reference in volts. These curves represent anode polarization as a function of current density. The lower values therefor represent better performance and lead to higher voltages between terminals of complete fuel cells. Curves A, B, C, D, E and F show the performance of six fuel cells as described above which employ anode electrodes 1, 2, 3, 4, 5, and 6, respectively from examples 1–6. FIG. 3 demonstrates clearly the superior performance of the anode electrodes of my invention over the performance of the anode containing only platinum.

EXAMPLES 13–15

One fuel cell electrode was made in accordance with FIGS. 1 and 2 of the drawing as described above in examples 1–6. The electrode employed a noble metal alloy powder of platinum-ruthenium as opposed to only platinum in examples 1–6. The catalytic and gas-adsorbing materials in the electrode contained 34 milligrams per square centimeter of platinum-ruthenium in which there was 29 weight percent of ruthenium, and 6.8 milligrams per square centimeter of chromium-tungsten oxide having the composition of $0.1 Cr_2O_3$ electrodes were made with platinum only bonded by PTFE as described above in examples 1–6.

EXAMPLES 16–17

One electrode containing platinum black and the electrode containing the platinum-ruthenium alloy and chromium-tungsten oxide from examples 13–15 were each employed as the anode in a fuel cell with an electrolyte of 5 normal $H_2SO_4$, and a cathode of platinum bonded with PTFE onto a current collector made in the same manner as the above anode electrode of examples 13–15. Each cathode has a platinum loading of 34 mg./cm.$^2$. A hydrophobic film of PTFE of 1.6 mg./cm.$^2$ was provided on the gas side of each anode and cathode. Oxygen gas was supplied to the cathode and a fuel having a composition of 78% $H_2$, 2% CO, 20% $CO_2$, and 0.25% $CH_4$ was supplied to the anode. The cell was operated at 25° C.

Figure 4:
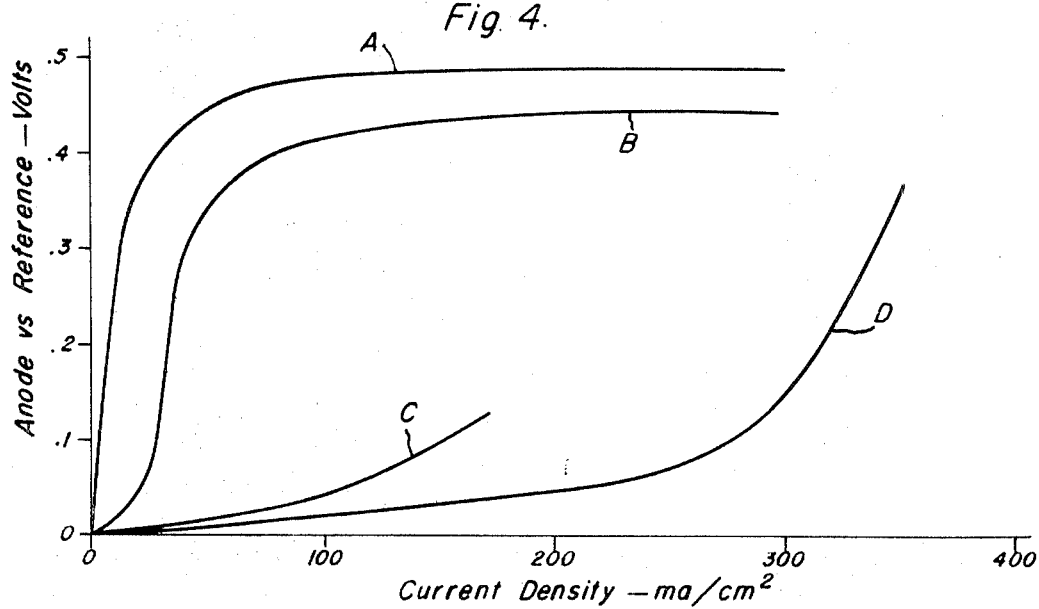
FIG. 4 is a plat showing the performance in a fuel cell with a synthetic reformer gas fuel of various fuel cell electrodes embodying my invention.

The effect of my electrode as set forth above was compared with the electrode set forth above which contained only platinum. This comparison is shown in FIG. 4 of the drawing wherein the current density in milliamperes per square centimeter is plotted against anode versus reference in volts. Curve A shows the performance of the fuel cell with the anode containing only platinum metal while Curve C shows the superior performance of the fuel cell with the anode of my invention. The lower value represents better performance.

EXAMPLES 18–19

One electrode containing platinum black and the same electrode containing the platinum-ruthenium alloy and chromium-tungsten oxide from examples 13–15 were each employed as the anode in a fuel cell with an electrolyte of 5 normal $H_2SO_4$ and a cathode of platinum bonded with PTFE onto a current collector made in the same manner as the above anode electrode of examples 13–15. Each cathode had a platinum loading of 34 mg./cm.$^2$. A hydrophobic film of PTFE was provided on the gas side of each anode and cathode. Oxygen gas was supplied to the cathode and a fuel having a composition of 78% $H_2$, 2% CO, 20% $CO_2$, and 0.25% $CH_4$ was supplied to the anode. The cell was operated at 85° C.

The effect of my electrode as set forth above was compared with the electrode set forth above which contained only platinum. This comparison is shown in FIG. 4 of the drawing wherein the current density in milliamperes per square centimeter is plotted against anode versus reference in volts. Curve B shows the performance of the fuel cell with the anode containing only platinum metal while Curve D shows the superior performance of the fuel cell with the anode of my invention. The lower value represents better performance.

While other modifications of the invention and variations thereof which may be employed within the scope of this invention have not been described, the invention is intended to include such as may be embraced within the following claims:

What I claim as new and desire to secure by U.S. Letters Patent is:

1. An electrode comprising catalytic and gas-adsorbing materials, a current collector, and a binder bonding the materials together and to the current collector in electronically conductive relationship, said catalytic and gas-adsorbing materials comprising a mixed oxide of chromium and tungsten and a metal selected from the class consisting of noble metals and alloys of noble metals.

2. An electrode as in claim 1, in which the metal is platinum.

3. An electrode as in claim 1, in which the metal is a platinum-ruthenium alloy.

4. An electrode as in claim 1, in which the binder in polytetrafluoroethylene.

5. An electrode as in claim 1, in which the metal is platinum, and the binder is polytetrafluoroethylene.

6. An electrode as in claim 1, in which the metal is a platinum-ruthenium alloy, and the binder is polytetrafluoroethylene.

7. A fuel comprising a cathode electrode, an oxidant supply for the cathode electrode, an acid electrolyte, a fuel containing carbon monoxide, and an anode electrode comprising catalytic and gas-adsorbing materials, a current collector, and a binder bonding the materials together and to the current collector in electronically conductive relationship, said catalytic and gas-adsorbing materials comprising a mixed oxide of chromium and tungsten and a metal selected from the class consisting of noble metals and alloys of noble metals.

8. A fuel cell as in claim 7, in which the metal is platinum.

9. A fuel cell as in claim 7, in which the metal is a platinum-ruthenium alloy.

10. A fuel cell as in claim 7, in which the binder is polytetrafluoroethylene.

11. A fuel cell as in claim 7, in which the metal is platinum, and the binder is polytetrafluoroethylene.

12. A fuel cell as in claim 7, in which the metal is a platinum-ruthenium alloy, and the binder is polytetrafluoroethylene.